(12) United States Patent
Marchetti et al.

(10) Patent No.: US 10,476,949 B2
(45) Date of Patent: Nov. 12, 2019

(54) PREDICTIVE AUTOSCALING IN COMPUTING SYSTEMS

(71) Applicant: Microsoft Technology Licensing, LLC, Redmond, WA (US)

(72) Inventors: Giovanni Marchetti, Redmond, WA (US); Richard Custance, New Castle (GB); Eoin Bailey, London (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 293 days.

(21) Appl. No.: 15/437,916

(22) Filed: Feb. 21, 2017

(65) Prior Publication Data

US 2018/0241812 A1    Aug. 23, 2018

(51) Int. Cl.
*H04L 29/08*    (2006.01)
*H04L 12/24*    (2006.01)

(52) U.S. Cl.
CPC ........ *H04L 67/1023* (2013.01); *H04L 41/147* (2013.01)

(58) Field of Classification Search
CPC .......................... H04L 67/1023; H04L 41/147
USPC ......................................... 709/226, 227, 229
See application file for complete search history.

(56) References Cited

U.S. PATENT DOCUMENTS

| 6,516,348 | B1* | 2/2003 | MacFarlane | .......... | H04L 41/147 370/232 |
| 9,300,552 | B2 | 3/2016 | Dube et al. | | |
| 9,323,599 | B1 | 4/2016 | Iyer et al. | | |
| 9,412,075 | B2 | 8/2016 | Padala et al. | | |
| 2014/0325072 | A1* | 10/2014 | Zhang | .................. | H04L 47/823 709/226 |
| 2015/0113120 | A1 | 4/2015 | Jacobson et al. | | |
| 2015/0289149 | A1* | 10/2015 | Ouyang | ................ | H04W 24/02 370/252 |

OTHER PUBLICATIONS

Khan, et al., "Workload Characterization and Prediction in the Cloud: A Multiple Time Series Approach", In Proceedings of IEEE/IFIP 3rd Workshop on Cloud Management, Apr. 16, 2012, pp. 1287-1294.

(Continued)

*Primary Examiner* — Chirag R Patel
*Assistant Examiner* — Marshall M McLeod
(74) *Attorney, Agent, or Firm* — Liang IP, PLLC

(57) ABSTRACT

Techniques of predictive autoscaling in distributed computing systems are disclosed herein. In one embodiment, a method includes receiving data representing consumption of a computing resource by an application executing on one or more servers in the distributed computing system. The method also includes processing the received data into a time series having multiple resource consumption values by the application with corresponding time stamps and decomposing the time series into a regular component and an irregular component. The method further includes generating a predicted consumption value of the computing resource by the application at a future time point according to the trend, cyclic pattern, or seasonal pattern of the regular component of the time series and causing immediate adjustment of an amount of the computing resource provisioned in the distributed computing system for the application according to the generated predicted consumption value.

20 Claims, 10 Drawing Sheets

(56) References Cited

OTHER PUBLICATIONS

"Monitoring the Oracle VM Server", http://www.eginnovations.com/Docs/eG%20Measurements%20Manuals/Monitoring%20Oracle%20VM%20Server.pdf, Retrieved on: Nov. 22, 2016, 122 pages.

"VMware vCenter Operations Manager Getting Started Guide", https://www.vmware.com/pdf/vcops-56-custom-ui-getting-started-guide.pdf, Retrieved on: Nov. 22, 2016, 102 pages.

Shen, et al., "CloudScale: Elastic Resource Scaling for Multi-Tenant Cloud Systems", in Proceedings of the 2nd ACM Symposium on Cloud Computing, Oct. 27, 2011, 14 pages.

Nikravesh, et al., "Towards an Autonomic Auto-Scaling Prediction System for Cloud Resource Provisioning", In Proceedings of IEEE/ACM 10th International Symposium on Software Engineering for Adaptive and Self-Managing Systems, May 18, 2015, 22 pages.

"vCenter Operations Manager for Horizon View Architecture", http://pubs.vmware.com/vcops-view-15/index.jsp?topic=%2Fcom.vmware.vcops-view15.installation.doc%2FGUID-6D06D470-6F87-4F2D-BD37-5AF795E1E1F4.html, Retrieved on: Nov. 22, 2016, 1 pages.

"Autoscaling Groups of Instances", http://web.archive.org/web/20160406103155/https:/cloud.google.com/compute/docs/autoscaler/, Published on: Apr. 6, 2016, 4 pages.

"Predictive auto-scaling in elastisys cloud platform", https://elastisys.com/cloud-platform-features/predictive-auto-scaling/, Published on: Aug. 12, 2015, 4 pages.

Xu, et al., "A mixture of HMM, GA, and Elman network for load prediction in cloud-oriented data centers", In Journal of Zhejiang University Science C, vol. 14, Issue 11, Nov. 1, 2013, 11 pages.

\* cited by examiner

PREDICTIVE AUTOSCALING IN COMPUTING SYSTEMS

BACKGROUND

Distributed computing systems typically include routers, switches, bridges, and other physical network devices that interconnect a large number of servers, network storage devices, and other types of computing devices. The individual servers can host one or more virtual machines or other types of virtualized components. The virtual machines can execute applications to provide cloud services or other suitable computing services to users.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Distributed computing typically utilizes virtual machines hosted on one or more servers to accommodate user demand for computation, communications, or other types of computing services. For example, servers can host one or more virtual machines to provide user logon, email hosting, web searching, website hosting, system updates, application development, or other types of computing services. As such, the users can share computing, memory, network, storage, or other suitable types of resources of hosting servers.

Autoscaling is a technique used to respond to load variations in distributed computing systems. For example, an autoscaler can monitor for processor usage on servers and provision additional processing capacities when the monitored processor usage exceeds a threshold (e.g., 90%). The additional processing capabilities can be provided as additional instances of virtual machines or allocated servers. In another example, the autoscaler can also reduce an amount of provisioned processing capacities by, for instance, terminating virtual machines, when the monitored processor usage is below another threshold (e.g., 20%). In other examples, the autoscaler can also monitor for a number of items in a job queue for a computing resource and adjust provisioned capacities based on the monitored number of items.

One drawback of the foregoing technique for autoscaling is being reactive and thus may not adequately address on-going load variations. For example, provisioning additional servers, virtual machines, or other types of computing resources may take a considerable period (e.g., twenty minutes or even longer). Meantime, users may experience service slowdowns or even outages when processor usage eventually reaches 100% due to rising computing demand. As such, adding computing capacities when the monitored processor usage exceeds 90% may be insufficient to address rising computing demands because of the delays involved in provisioning the additional computing capacities.

On the other hand, valuable computing resources may be wasted due to delays involved in reducing the provisioned computing resources when user demand is decreasing. For example, when monitored processor usage is below 20%, the autoscaler can cause a number of provisioned virtual machines to terminate. However, terminating a virtual machine can take up to about thirty minutes or even longer due to data persistence or other related operations. As such, computing, power, network, and other resources associated with the virtual machine to be terminated are wasted during such a termination delay.

Several embodiments of the disclosed technology can address at least some of the foregoing drawbacks by implementing predictive autoscaling based on historical data of resource consumption. In one embodiment, a predictive autoscaler can be configured to receive resource consumption data reported by individual applications executing in a distributed computing system. Examples of such resource consumption can include processor usage, network bandwidth consumption, an amount of storage consumed, and/or other suitable types of computing resource. In other embodiments, the predictive autoscaler can be configured to query servers, virtual machines, or applications in the distributed computing system for the resource consumption data.

Based on the resource consumption data related to the applications, the predictive autoscaler can be configured to process and generate time series of resource consumption. For example, the predictive autoscaler can generate a time series of average processor consumption of an application by averaging received processor usage data over ten-minute windows and associate each average processor usage with a time stamp of the individual ten-minute windows. In other examples, the predictive autoscaler can also generate the time series by interpolating, extrapolating, filtering, or performing other suitable operations on the received resource consumption data. In certain embodiments, the time series of resource consumption can be continuously updated with new resource consumption data in an accumulative, moving-window, or other suitable fashions. For instance, in one implementation, the time series can be updated by removing a certain amount of data (e.g., one data point) from the beginning of the time series and appending the same amount of data at the end of the time series. In other implementations, the time series can be updated by appending new resource consumption data at the end of the time series without removing any data from the time series.

The predictive autoscaler can also be configured to decompose the generated time series into a regular component and an irregular component that are additive, multiplicative, or in other suitable relationships with each other. The regular component can include one or more of a trend element, a cyclical element, and a seasonal element. The trend element can reflect a long-term progression in the time series, for example, in an increasing or decreasing direction. The cyclical element can reflect repeated but non-periodic fluctuations in the time series. The seasonal element can reflect patterns in the time series that repeat over a fixed or known period (e.g., a day, a week, a month, etc.). The irregular component (or "random component") can reflect a part of the time series without discernable patterns, for example, as residuals or remainders of the time series after the regular component is removed. In certain embodiments, the time series can be decomposed using, for example, suitable R programs supported by the R Foundation. In other embodiments, the time series can be decomposed using Fourier transformation, Laplace transformation, or other suitable techniques.

Based on the obtained regular and/or irregular components of the time series, the predictive autoscaler can be configured to determine predicted resource consumption values in a future time point (e.g., in ten, twenty, or thirty minutes). In certain embodiments, the predictive autoscaler can determine a long-term prediction value of ten virtual machines at a future time point based on a combination of the trend, cyclic, and/or seasonal element of the regular component. The predictive autoscaler can also determine a short-term prediction value of two virtual machines at the same time point by applying recurrent neural networks, regression, or other suitable techniques to the irregular component. The predictive autoscaler can then additively or otherwise combine the long-term and short-term prediction values to derive at an overall predicted resource consumption value (e.g., twelve virtual machines) at the future time point. In other embodiments, the predictive autoscaler can use only the long-term prediction value without the short-term prediction value or use a combination of the long-term and short-term prediction values with combination of reactive control as described above or other suitable control techniques.

The predictive autoscaler can provide the determined overall predicted resource consumption value to a platform controller (e.g., Microsoft Azure® Controller) to adjust resource provisions accordingly without waiting for various resource consumptions by applications to exceed corresponding thresholds. For instance, in the example above, the platform controller can immediately initiate provisioning of additional such that twelve virtual machines are available for executing a particular application in thirty minutes. If there are currently fourteen virtual machine provisioned for the application, the platform controller can also initiate termination of two virtual machines such that only twelve virtual machines remain in thirty minutes.

As such, unlike in certain implementations in which an autoscaler can only take actions when potential scalability issues have occurred, several embodiments of the disclosed technology can proactively scale up or down the amount of provisioned computing resources before potential scalability issues occur. Accordingly, several embodiments of the disclosed technology can improve user experience with computing services by anticipating an increase or decrease of resource demands based on the regular and irregular components of the time series of historical resource consumption. Several embodiments of the disclosed technology can also save computing resources by reducing or even eliminating delays in releasing idle computing resources.

DETAILED DESCRIPTION

Figure 1:
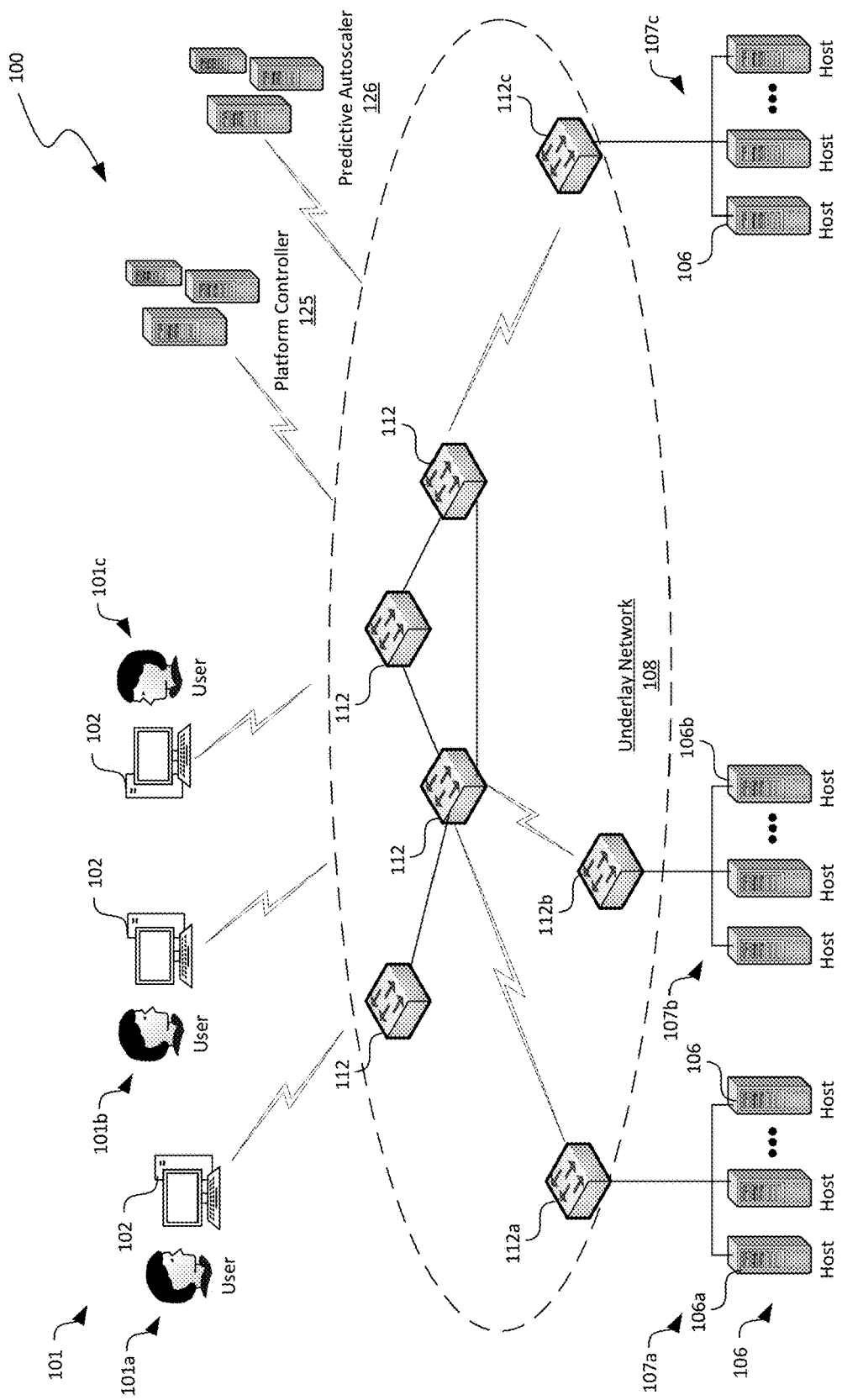
FIG. 1 is a schematic diagram illustrating a distributed computing system implementing predictive autoscaling based on historical resource consumption patterns in accordance with embodiments of the disclosed technology.

Certain embodiments of systems, devices, components, modules, routines, data structures, and processes for predictive autoscaling in datacenters or other suitable distributed computing systems are described below. In the following description, specific details of components are included to provide a thorough understanding of certain embodiments of the disclosed technology. A person skilled in the relevant art will also understand that the technology can have additional embodiments. The technology can also be practiced without several of the details of the embodiments described below with reference to FIGS. 1-8.

As used herein, the term "distributed computing system" generally refers to an interconnected computer network having a plurality of network nodes that connect a plurality of servers or hosts to one another or to external networks (e.g., the Internet). The term "network node" generally refers to a physical network device. Example network nodes include routers, switches, hubs, bridges, load balancers, security gateways, or firewalls. A "host" generally refers to a physical computing device configured to implement, for instance, one or more virtual machines or other suitable virtualized components. For example, a host can include a server having a hypervisor configured to support one or more virtual machines or other suitable types of virtual components.

A computer network can be conceptually divided into an overlay network implemented over an underlay network. An "overlay network" generally refers to an abstracted network implemented over and operating on top of an underlay network. The underlay network can include multiple physical network nodes interconnected with one another. An overlay network can include one or more virtual networks. A "virtual network" generally refers to an abstraction of a portion of the underlay network in the overlay network. A virtual network can include one or more virtual end points referred to as "tenant sites" individually used by a user or "tenant" to access the virtual network and associated computing, storage, or other suitable resources. A tenant site can host one or more tenant end points ("TEPs"), for example, virtual machines. The virtual networks can interconnect multiple TEPs on different hosts. Virtual network nodes in the overlay network can be connected to one another by virtual links individually corresponding to one or more network routes along one or more physical network nodes in the underlay network.

Also used herein, the term "computing resource" or "system resource" generally refers to any physical or virtual component of limited availability within a computer system. Example computing resources can include processor capacities (e.g., CPU), network capacities (e.g., network connections and network bandwidth), and computer readable storage capacities (e.g., memory blocks in solid state devices). Executing an application in a computer system can consume various amount of computing resources. For example, executing an application for voice-over-IP conference can consume a significantly amount of network resources. In another example, executing an application of database management can consume an amount of processor capacities and storage spaces.

Further, as used herein, the term a "time series" generally refers to a sequence of data points indexed, listed, or graphed with respect to time. In certain examples, a time series can include a sequence of data points taken at successive equally spaced points in time (e.g., ten minutes) to form a sequence of discrete-time data. In other examples, a time series can also include a sequence of data points taken at variable time intervals.

A time series can be "decomposed" by applying regression, recurrent neural networks, Elman networks, Jordan networks, or other suitable analysis techniques on the time series to extract a "regular component" and an "irregular component." A regular component can include one or more of a trend, a cyclic pattern, or a seasonal pattern in the time series. The trend element can reflect a long-term progression in the time series, for example, in an increasing or decreasing direction. The cyclical element can reflect repeated but non-periodic fluctuations in the time series. The seasonal element can reflect patterns in the time series that repeat over a fixed or known period (e.g., a day, a week, a month, etc.). The irregular component (or "random component") can reflect a part of the time series without discernable patterns, for example, as residuals or remainders of the time series after the regular component is removed.

The trend, the cyclic pattern, or the seasonal pattern can be used to predict a future data value in the time series at a future time point. For example, if the time series has a trend that is linearly, exponentially, or increasing/decreasing at a determinable rate, a future data value can be calculated based on an existing value and the determinable rate. In another example, if the time series has a cyclic pattern, a future data value can be predicted as generally equal to a historical data value of a previous cycle according to the cyclic pattern. In a further example, if the time series has a seasonal pattern, then a future data value can be predicted by correlating the future time point with the seasonal pattern.

In addition, as used herein, the term "provisioning" a computing resource can include operations related to preparing and equipping one or more components of a computer system to allow the one or more components to provide desired computing services to users. For example, provisioning processor capacities can include instructing one or more servers to instantiate one or more instances of virtual machines for executing a desired application, monitoring an instantiation status, and indicating instantiation successful upon completion. In another example, provisioning network capacities can include allowing additional network bandwidth to be used by a desired application.

In certain computing systems, autoscaling involves reactively adjusting computing resources provisioned for users based on overutilization or underutilization thresholds. Such reactive autoscaling may not adequately address on-going load variations because the autoscaling is not triggered until scalability issues have already occurred. As such, users may experience service slowdowns or even outages during overutilization. During underutilization, such autoscaling may be too slow to reduce the amount of computing resources provisioned to accommodate a reduced load, and thus causing waste in affected computing resources.

Several embodiments of the disclosed technology can address at least some of the foregoing drawbacks by implementing predictive autoscaling based on historical data of resource consumption. In certain embodiments, a predictive autoscaler can be configured to receive resource consumption data associated with individual applications executing in a distributed computing system. The predictive autoscaler can also process the received resource consumption data into a time series. Based on the time series, the predictive autoscaler can be configured to predict a future resource consumption value at a future time point and cause adjustment of resource provisioning in the distributed computing system prior to any scalability issues occur. As such, several embodiments of the disclosed technology can improve user experience with computing services by anticipating an increase or decrease of resource demands and can also save computing resources by reducing or even eliminating delays in releasing idle computing resources, as described in more detail below with reference to FIGS. 1-8.

FIG. 1 is a schematic diagram illustrating a distributed computing system 100 implementing predictive autoscaling in accordance with embodiments of the disclosed technology. As shown in FIG. 1, the distributed computing system 100 can include an underlay network 108 interconnecting a plurality of hosts 106, a plurality of client devices 102 associated with corresponding users 101, a platform controller 125, and an autoscaler 126 operatively coupled to one another. Even though particular components of the distributed computing system 100 are shown in FIG. 1, in other embodiments, the distributed computing system 100 can also include additional and/or different components or arrangements. For example, in certain embodiments, the autoscaler 126 can be an integral part of the platform controller 125. In other embodiments, the distributed computing system 100 can also include network storage devices, additional hosts, and/or other suitable components (not shown).

As shown in FIG. 1, the underlay network 108 can include one or more network nodes 112 that interconnect the multiple hosts 106, the users 101, and the platform controller 125. In certain embodiments, the hosts 106 can be organized into racks, action zones, groups, sets, or other suitable divisions. For example, in the illustrated embodiment, the hosts 106 are grouped into three host sets identified individually as first, second, and third host sets 107a-107c. In the illustrated embodiment, each of the host sets 107a-107c is operatively coupled to a corresponding network nodes 112a-112c, respectively, which are commonly referred to as "top-of-rack" or "TOR" network nodes. The TOR network nodes 112a-112c can then be operatively coupled to additional network nodes 112 to form a computer network in a hierarchical, flat, mesh, or other suitable types of topology. The computer network can allow communication between hosts 106, the platform controller 125, and the users 101. In other embodiments, the multiple host sets 107a-107c may share a single network node 112 or can have other suitable arrangements.

The hosts 106 can individually be configured to provide computing, storage, and/or other suitable cloud or other suitable types of computing services to the users 101. For example, as described in more detail below with reference to FIG. 2, one of the hosts 106 can initiate and maintain one or more virtual machines 144 (shown in FIG. 2) upon requests from the users 101. The users 101 can then utilize the initiated virtual machines 144 to perform computation, communication, and/or other suitable tasks. In certain embodiments, one of the hosts 106 can provide virtual machines 144 for multiple users 101. For example, the host 106a can host three virtual machines 144 individually corresponding to each of the users 101a-101c. In other embodiments, multiple hosts 106 can host virtual machines 144 for the users 101a-101c.

The client devices 102 can each include a computing device that facilitates corresponding users 101 to access cloud services provided by the hosts 106 via the underlay network 108. For example, in the illustrated embodiment, the client devices 102 individually include a desktop computer. In other embodiments, the client devices 102 can also include laptop computers, tablet computers, smartphones, or other suitable computing devices. Even though three users 101 are shown in FIG. 1 for illustration purposes, in other embodiments, the distributed computing system 100 can facilitate any suitable number of users 101 to access cloud or other suitable types of computing services provided by the hosts 106.

The platform controller 125 can be configured to manage operations of various components of the distributed computing system 100. For example, the platform controller 125 can be configured to allocate virtual machines 144 (or other suitable resources) in the distributed computing system 100, monitor operations of the allocated virtual machines 144, or terminate any allocated virtual machines 144 once operations are complete. In the illustrated implementation, the platform controller 125 is shown as an independent hardware/software component of the distributed computing system 100. In other embodiments, the platform controller 125 can also be a datacenter controller, a fabric controller, or other suitable types of controller or a component thereof implemented as a computing service on one or more of the hosts 106.

The predictive autoscaler 126 can be configured to predict future resource consumption values associated with an application executing in the distributed computing system 100 based on historical data of resource consumption by the application. In certain embodiments, the predictive autoscaler 126 can be configured to receive resource consumption data associated with individual applications executing in a distributed computing system. The predictive autoscaler 126 can also process the received resource consumption data into a time series. Based on the time series, the predictive autoscaler 126 can be configured to predict a future resource consumption value at a future time point and cause adjustment of resource provisioning in the distributed computing system 100 prior to any scalability issues occur. In other embodiments, the generation of the time series and/or other suitable processing of the time series can be performed by, for example, the platform controller 125, one of the hosts 106, or other suitable components. By proactively anticipating load variations, several embodiments of the disclosed technology can improve user experience with computing services and can also save computing resources by reducing or even eliminating delays in releasing idle computing resources, as described in more detail below with reference to FIGS. 3A-3C.

Figure 2:
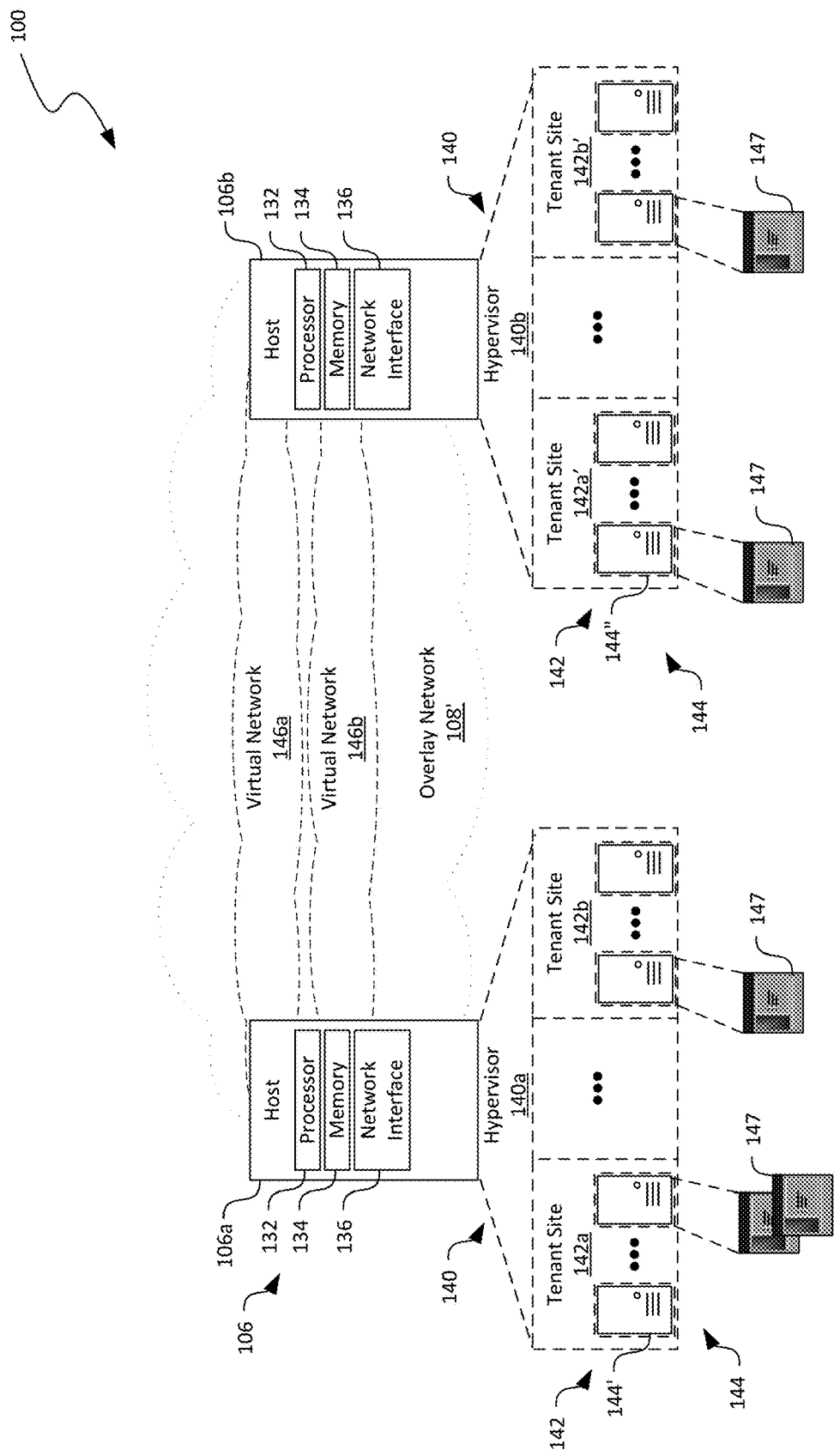
FIG. 2 is a schematic diagram illustrating certain hardware/software components of the distributed computing system of FIG. 1 in accordance with embodiments of the disclosed technology.

FIG. 2 is a schematic diagram illustrating certain hardware/software components of the distributed computing system 100 in accordance with embodiments of the disclosed technology. In particular, FIG. 2 illustrates an overlay network 108' that can be implemented on the underlay network 108 in FIG. 1. Though particular configuration of the overlay network 108' is shown in FIG. 2, In other embodiments, the overlay network 108' can also be configured in other suitable ways. In FIG. 2, only certain components of the underlay network 108 of FIG. 1 are shown for clarity.

In FIG. 2 and in other Figures herein, individual software components, objects, classes, modules, and routines may be a computer program, procedure, or process written as source code in C, C++, C#, Java, and/or other suitable programming languages. A component may include, without limitation, one or more modules, objects, classes, routines, properties, processes, threads, executables, libraries, or other components. Components may be in source or binary form. Components may include aspects of source code before compilation (e.g., classes, properties, procedures, routines), compiled binary units (e.g., libraries, executables), or artifacts instantiated and used at runtime (e.g., objects, processes, threads).

Components within a system may take different forms within the system. As one example, a system comprising a first component, a second component and a third component can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a network server, a laptop computer, a smartphone, and/or other suitable computing devices.

Equally, components may include hardware circuitry. A person of ordinary skill in the art would recognize that hardware may be considered fossilized software, and software may be considered liquefied hardware. As just one example, software instructions in a component may be burned to a Programmable Logic Array circuit, or may be designed as a hardware circuit with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media excluding propagated signals.

As shown in FIG. 2, the first host 106a and the second host 106b can each include a processor 132, a memory 134, and an input/output component 136 operatively coupled to one another. The processor 132 can include a microprocessor, a field-programmable gate array, and/or other suitable logic devices. The memory 134 can include volatile and/or nonvolatile media (e.g., ROM; RAM, magnetic disk storage media; optical storage media; flash memory devices, and/or other suitable storage media) and/or other types of computer-readable storage media configured to store data received from, as well as instructions for, the processor 132 (e.g., instructions for performing the methods discussed below with reference to FIGS. 4A and 4B). The input/output component 136 can include a display, a touch screen, a keyboard, a mouse, a printer, and/or other suitable types of input/output devices configured to accept input from and provide output to an operator and/or an automated software controller (not shown).

The first and second hosts 106a and 106b can individually contain instructions in the memory 134 executable by the processors 132 to cause the individual processors 132 to provide a hypervisor 140 (identified individually as first and second hypervisors 140a and 140b) and a status agent 141 (identified individually as first and second status agent 141a and 141b). Even though the hypervisor 140 and the status agent 141 are shown as separate components, in other embodiments, the status agent 141 can be a part of the hypervisor 140 or an operating system (not shown) executing on the corresponding host 106. In further embodiments, the status agent 141 can be a standalone application.

The hypervisors 140 can individually be configured to generate, monitor, terminate, and/or otherwise manage one or more virtual machines 144 organized into tenant sites 142. For example, as shown in FIG. 2, the first host 106a can provide a first hypervisor 140a that manages first and second tenant sites 142a and 142b, respectively. The second host 106b can provide a second hypervisor 140b that manages first and second tenant sites 142a' and 142b', respectively. The hypervisors 140 are individually shown in FIG. 2 as a software component. However, in other embodiments, the hypervisors 140 can be firmware and/or hardware components. The tenant sites 142 can each include multiple virtual machines 144 for a particular tenant (not shown). For example, the first host 106a and the second host 106b can both host the tenant site 142a and 142a' for a first tenant 101a (FIG. 1). The first host 106a and the second host 106b can both host the tenant site 142b and 142b' for a second tenant 101b (FIG. 1). Each virtual machine 144 can be executing a corresponding operating system, middleware, and/or applications.

Also shown in FIG. 2, the distributed computing system 100 can include an overlay network 108' having one or more virtual networks 146 that interconnect the tenant sites 142a and 142b across multiple hosts 106. For example, a first virtual network 142a interconnects the first tenant sites 142a and 142a' at the first host 106a and the second host 106b. A second virtual network 146b interconnects the second tenant sites 142b and 142b' at the first host 106a and the second host 106b. Even though a single virtual network 146 is shown as corresponding to one tenant site 142, in other embodiments, multiple virtual networks 146 (not shown) may be configured to correspond to a single tenant site 146.

The virtual machines 144 can be configured to execute one or more applications 147 to provide suitable cloud or other suitable types of computing services to the users 101 (FIG. 1). The virtual machines 144 on the virtual networks 146 can also communicate with one another via the underlay network 108 (FIG. 1) even though the virtual machines 144 are located on different hosts 106. Communications of each of the virtual networks 146 can be isolated from other virtual networks 146. In certain embodiments, communications can be allowed to cross from one virtual network 146 to another through a security gateway or otherwise in a controlled fashion. A virtual network address can correspond to one of the virtual machine 144 in a particular virtual network 146. Thus, different virtual networks 146 can use one or more virtual network addresses that are the same. Example virtual network addresses can include IP addresses, MAC addresses, and/or other suitable addresses.

Figure 3A:
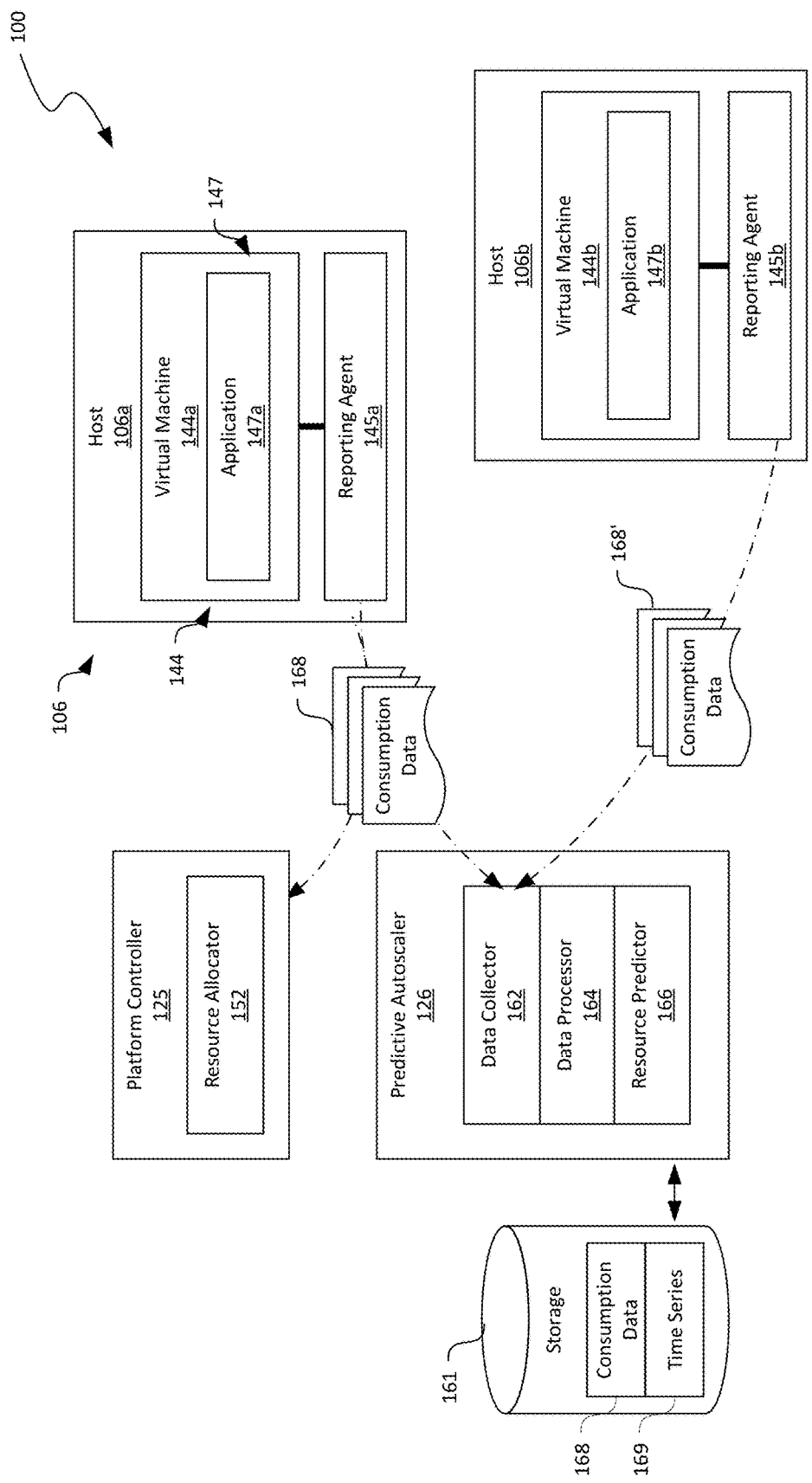
FIGS. 3A-3C are block diagrams of certain hardware/software components of the distributed computing system of FIG. 1 during certain stages of predictive autoscaling of computing resources in the distributed computing system of FIG. 1 in accordance with embodiments of the disclosed technology.
Figure 3B:
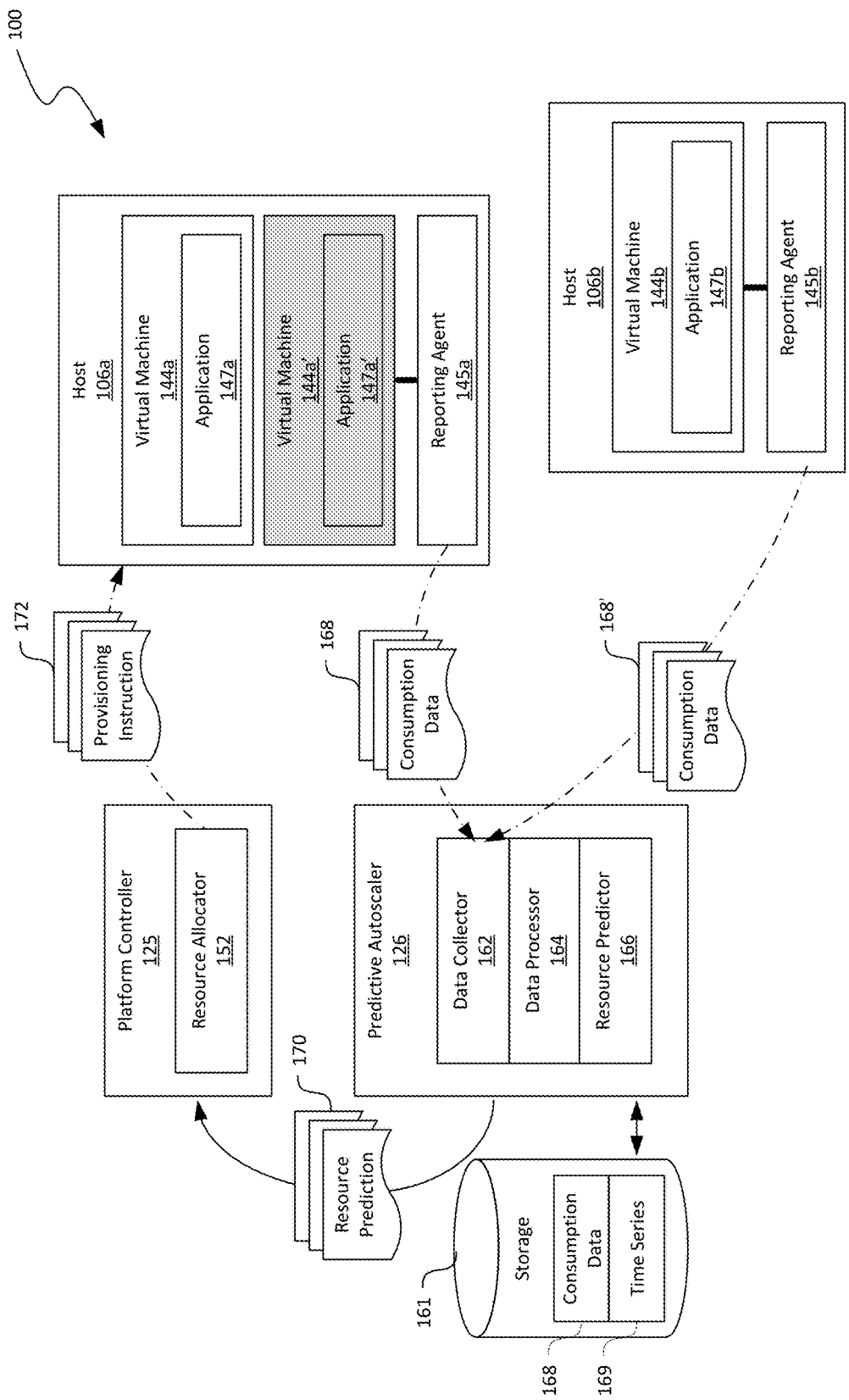
Figure 3C:
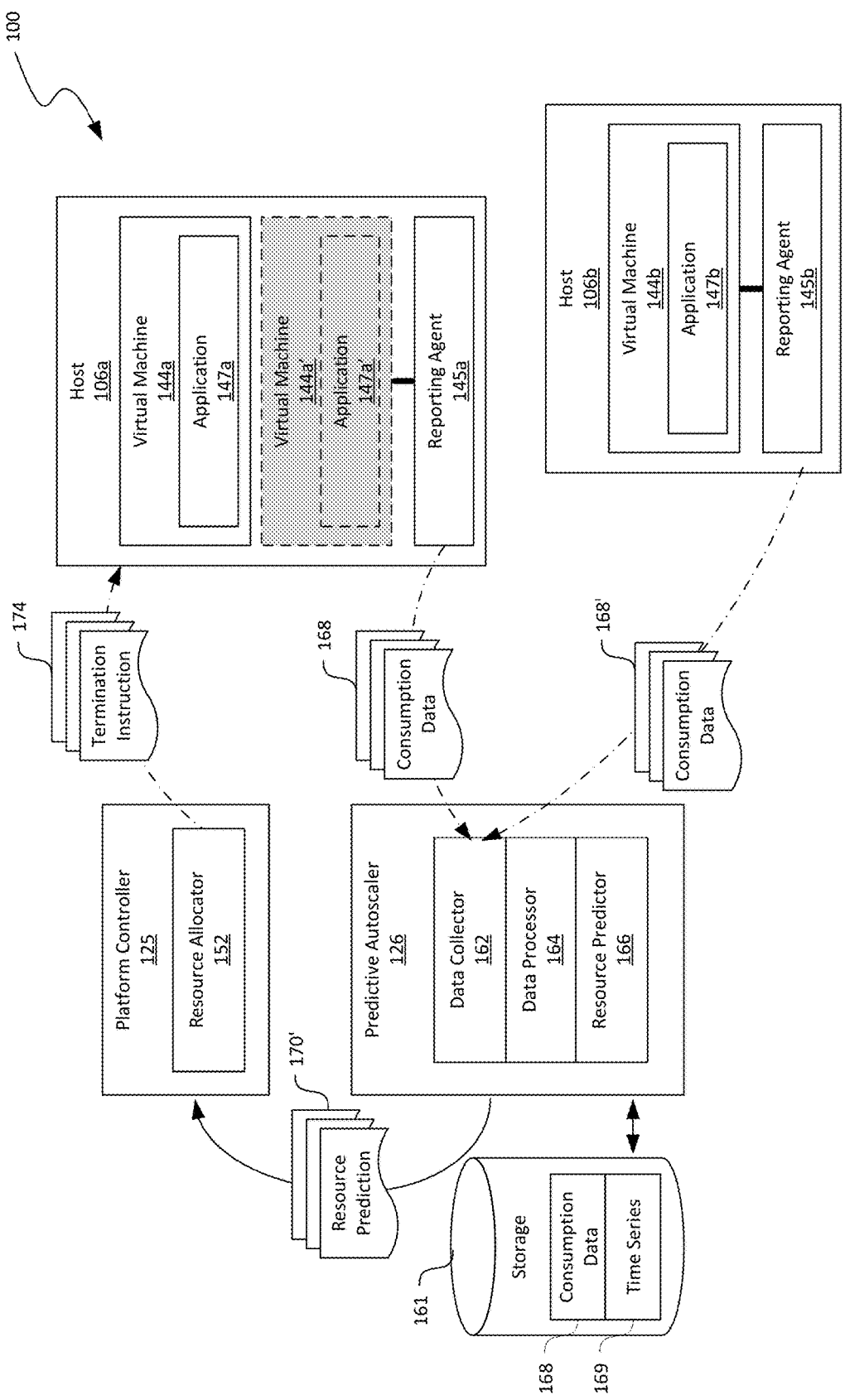

FIGS. 3A-3C are block diagrams of certain hardware/software components of the distributed computing system 100 of FIG. 1 during certain stages of predictive autoscaling of computing resources in the distributed computing system 100 of FIG. 1 in accordance with embodiments of the disclosed technology. As shown in FIG. 3A, the platform controller 125 can include a resource allocator 152 that is configured to allocate processing, memory, network, storage, or other suitable types of resources to a task or application 147 for providing a cloud computing service requested by the users 101. In one embodiment, the resource allocator 152 can include a virtual machine allocator configured to allocate a virtual machine 144 to a physical host 106. In other embodiments, the resource allocator 152 can include memory, network, storage, or other suitable types of allocator. Even though FIG. 3A shows that the platform controller 125 only includes the resource allocator 152, in other embodiments, the platform controller 125 can also include operation monitors or other suitable components.

In certain embodiments, the platform controller 125 can also be configured to monitor operations of the applications 147, the virtual machines 144, and/or the hosts 106 by receive the consumption data 168 periodically or in other suitable manners, as shown in FIG. 3A. Based on the received consumption data 168, the resource allocator 152 can be configured to provision additional or reduce an existing amount of provisioned computing resources for the applications 147 when the received consumption data exceeds an overutilization or underutilization threshold, respectively. In one implementation, only when neither of the overutilization or underutilization threshold is exceeded, the resource allocator 152 can adjust the amount of provisioned computing resources based on input from the predictive autoscaler 126. In other implementations, the resource allocator 152 can apply such adjustment in other suitable manners.

Also shown in FIG. 3A, the predictive autoscaler 126 can be operatively coupled to a computer readable storage 161 and include a data collector 162, a data processor 164, and a resource predictor 166 operatively coupled to one another. Even though particular components and configurations of the predictive autoscaler 126 are shown in FIGS. 3A-3C, in other embodiments, the predictive autoscaler 126 can also include other suitable components or arrangements. For example, in certain embodiments, the storage 161 can be an internal non-volatile storage of a computing device implementing the predictive autoscaler 126. In other examples, the storage 161 can also be a network storage space in the distributed computing system 100 (FIG. 1).

The data collector 162 can be configured to collect consumption data 168 from one or more applications 147 or the virtual machines 144 hosted on the first and second hosts 106a and 106b. In certain embodiments, the data collector 162 can query the first and second hosts 106a and 106b regarding utilization of CPU, volatile memory, network bandwidth, non-volatile storage, or other suitable types of consumption data 168 for individual applications 147 and virtual machines 144 on each of the first and second hosts 106a and 106b. The data collector 162 can query the first and second hosts 106a and 106b periodically or in other suitable manners.

In other embodiments, the first and second hosts 106a and 106b can each include a reporting agent 145 (illustrated as first and second reporting agents 145a and 145b) configured to report the consumption data 168 to the data collector 162 periodically or in other suitable manners. The reporting agents 145 can be a part of the operating system, hypervisor 140 (FIG. 2), or other suitable component on the first and second hosts 106a and 106b. In further embodiments, the data collector 162 can implement a combination of the foregoing data retrieving techniques. The data collector 162 can then provide the received consumption data 168 to the data processor 164 for further processing and optionally store the consumption data 168 in a storage 161.

The data processor 164 can be configured to process the received consumption data 168 into a time series 169. In certain embodiments, the first and second hosts 106a and 106b can each host virtual machines 144 that execute instances of the same applications 147. For example, as shown in FIG. 3A, the first application 147a executing on the first host 106a and the second application 147b executing on the second host 106b can be instances of a single application 147. In such embodiments, the data processor 164 can be configured to aggregate the received consumption data 168 as being related to the single application 147. In other embodiments, the first and second applications 147a and 147b can also be instances of different applications 147. In such embodiments, the data processor 164 can generate process the received consumption data 168 and 168' as being related to different time series 169.

The data processor 164 can be configured to apply various techniques in generating the time series 169. For example, in one embodiment, the data processor 164 can be configured to calculate an average consumption value of the received consumption data 168 during a preset period (e.g., ten minutes). The data processor 164 can also be configured to associate the calculated average consumption value with a time stamp and generate a data point for the time series 169. In other embodiments, the data processor 164 can also apply interpolation, extrapolation, or other suitable techniques to generate the time series. As shown in FIG. 3A, the generated time series 169 can then be stored in the storage 161 or in other suitable storage locations.

The data processor 164 can also be configured to periodically or continuously update the generated time series 169. For example, in certain embodiments, the data processor 164 can be configured to update the time series 169 by removing a data point from a beginning portion of the time series 169 and appending a new data point to an end portion of the time series in a moving-window fashion. In other embodiments, the data processor 164 can also be configured to update the time series 169 in an accumulative fashion (i.e., appending new data points without removing any existing data points) or in other suitable fashions.

The resource predictor 166 can be configured to predict a future consumption value based on the generated time series 169. In certain embodiments, the resource predictor 166 can retrieve the time series 169 in the storage 161 periodically or in other suitable manners and generate a future consumption value based thereon. In other embodiments, the data processor 164 can provide the generate time series 169 to the resource predictor 166 for further processing.

In accordance with aspect of the disclosed technology, the resource predictor 166 can be configured to analyze the time series by applying various techniques. For example, the resource predictor 166 can decompose the generated time series into a regular component and an irregular component by applying a rate change analysis. The regular component can include one or more of a trend, a cyclic pattern, or a seasonal pattern while the irregular component representing a random portion of the time series 169. In other examples, the resource predictor 166 can extract the regular and/or irregular components from the time series 169 by applying curve fitting, function approximation, signal estimation, segmentation, or other suitable techniques.

Based on the extracted regular and/or irregular components, the resource predictor 166 can be configured a predicted consumption value of the computing resource by an application at a future time point. In certain embodiments, the resource predictor 166 can be configured to set the predicted consumption value based on the trend, cyclic pattern, or seasonal pattern of the regular component of the time series 169. In other embodiments, the resource predictor 166 can set a long-term predicted consumption value of the computing resource by the application 147 at the future time point according to the trend, cyclic pattern, or seasonal pattern of the regular component of the time series 169. The resource predictor 166 can also determine a short-term predicted consumption value of the computing resource by the application 147 at the future time point by applying, for instance, a recurrent neural network to the time series. The resource predictor 166 can then be configured to combine the long-term and short-term predicted consumption values, for example, by modifying the long-term predicted consumption value with the short-term predicted consumption value.

As shown in FIG. 3B, the predictive autoscaler 126 can provide a resource prediction 170 to the platform controller 125 for adjusting an amount of provisioned computing resources for the applications 147. For example, in the illustrated embodiment, in response to the received resource prediction 170, the resource allocator 152 can transmit a provisioning instruction 172 to the first host 106a to instantiate another virtual machine 144a' (shown with shading for clarity) for executing another instance of the application 147a'. In another example, as shown in FIG. 3C, in response to another received resource prediction 170', the resource allocator 152 can transmit a termination instruction 174 to the first host 106a to terminate the virtual machine 144a' (shown in phantom lines for clarity).

Figure 4A:
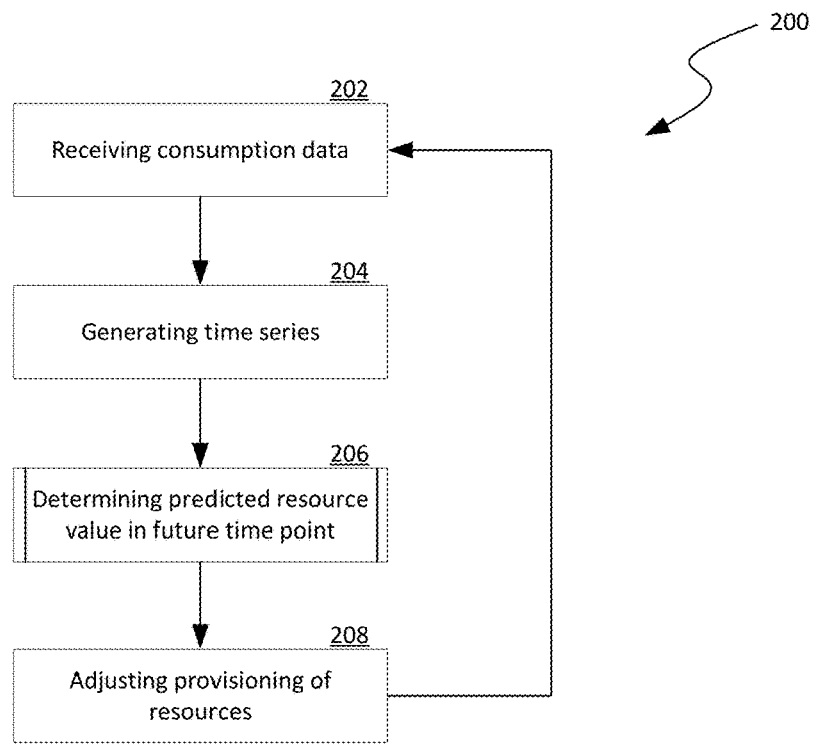
FIGS. 4A and 4B are flowcharts illustrating processes of predictive autoscaling in a distributed computing system in accordance with embodiments of the disclosed technology.
Figure 4B:
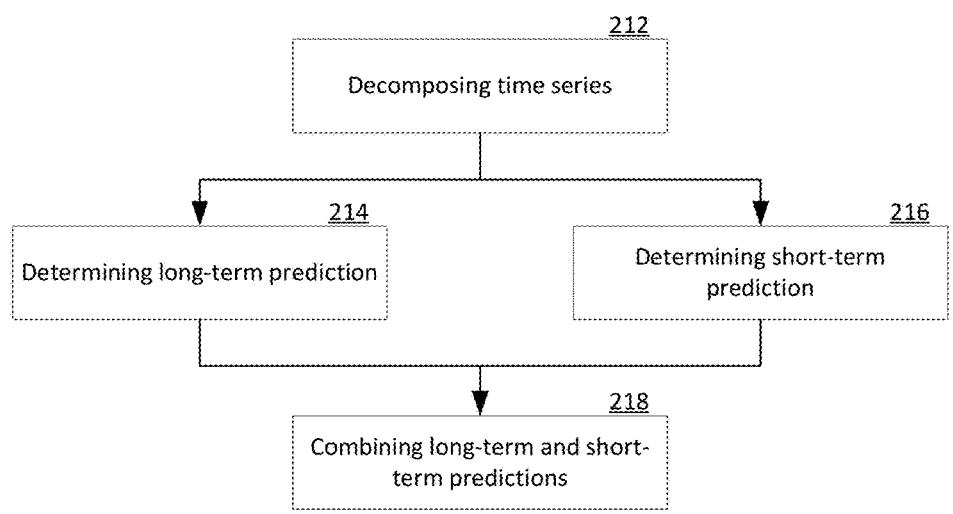

FIGS. 4A and 4B are flowcharts illustrating processes of predictive autoscaling in a distributed computing system 100 in accordance with embodiments of the disclosed technology. Even though the process 200 is described in relation to the distributed computing system 100 of FIGS. 1 and 2 and the hardware/software components of FIGS. 3A-3C, in other embodiments, the process 200 can also be implemented in other suitable systems.

As shown in FIG. 4A, the process 200 includes receiving consumption data at stage 202. The consumption data can include data representing consumption values of various computing resources by individual applications at various time points. The process 200 can then include generating a time series based on the received consumption data for a computing resource consumed by a particular application at stage 204. In certain embodiments, the time series can be generated by calculating average values over a time window (e.g., ten minutes). In other embodiments, interpolation, extrapolation, or other suitable techniques can also be applied to generate the time series. The process 200 can then include determining a predicted resource value for the computing resource consumed by the application at a future time point at stage 206. In certain embodiments, determining the predicted resource value can include decomposing the time series into regular and irregular components and derive the predicted resource value based on the regular component, irregular component, or a combination thereof, as described above with reference to FIGS. 3A-3C. Example operations for determining the predicted resource value are described in more detail below with reference to FIG. 4B. The process 200 can then include adjusting provisioning of the computing resources according to the determined predicted resource value at the future time point at stage 208.

As shown in FIG. 4B, example operations for determining the predicted resource value can include decomposing the time series at stage 212 by applying, for example, rate change analysis on the time series. The time series can be decomposed into a regular component and an irregular component. The operations can then include determining a long-term prediction according to the regular component at stage 214 and determining a short-term prediction according to the irregular component at stage 216. The operations can further include combining the long-term and short-term predictions at stage 218, for example, linearly, with weighted factors, or in other suitable manners.

Figure 5:
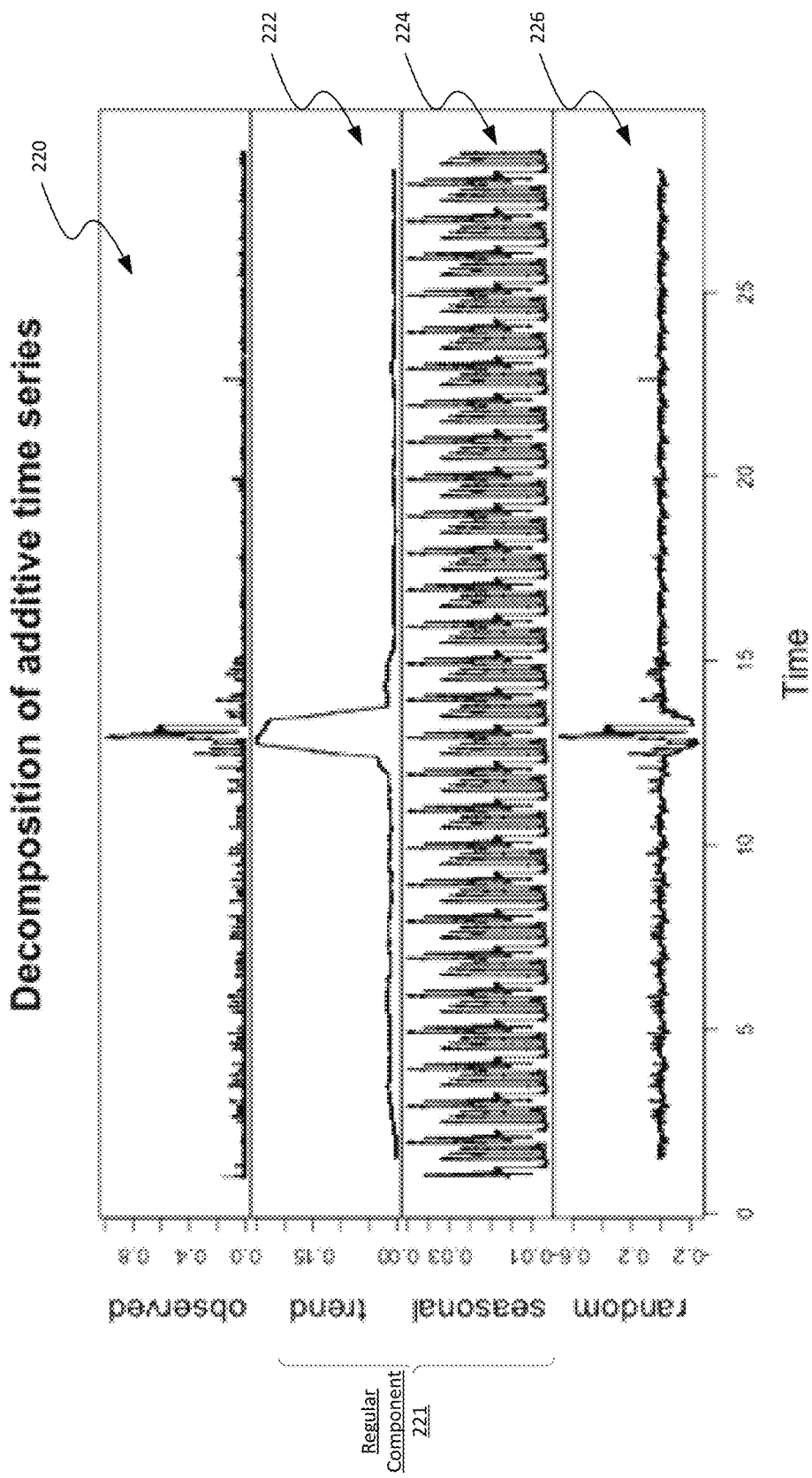
FIG. 5 is a resource consumption versus time plot illustrating decomposition of an example time series of resource consumption in accordance with embodiments of the disclosed technology.

FIG. 5 is a resource consumption versus time plot illustrating decomposition of an example time series 220 of resource consumption in accordance with embodiments of the disclosed technology. As shown in FIG. 5, the observed time series 220 can include multiple data points plotted with respect to time. After applying rate change analysis or other suitable types of analysis, the observed time series 220 can be decomposed into a regular component 221 having a trend 222 and a seasonal pattern 224, and an irregular component 226 shown random data points.

Figure 6:
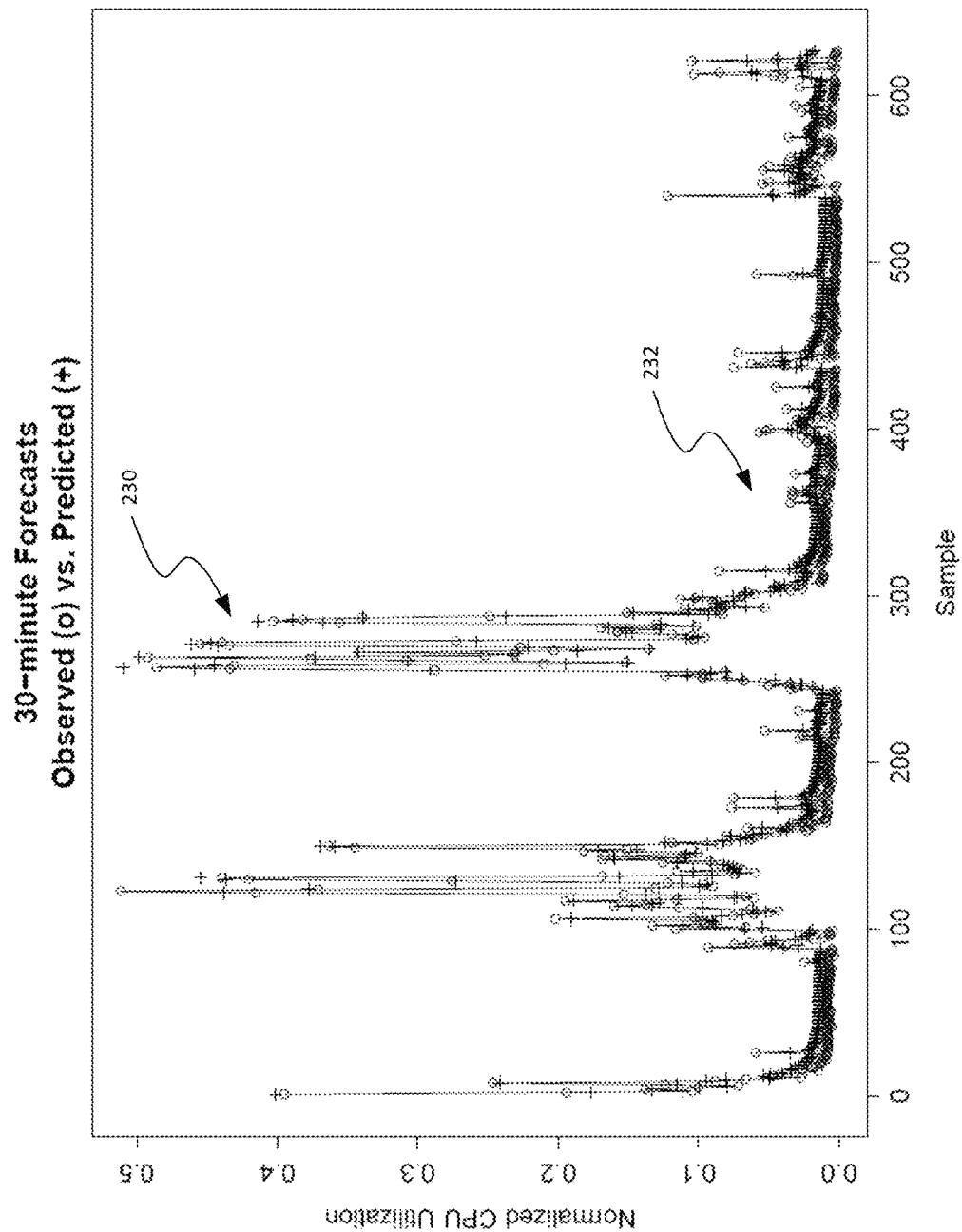
FIG. 6 is a normalized processor utilization versus time plot illustrating example predicted resource consumption versus actual observed resource consumption during an experiment in accordance with embodiments of the disclosed technology.
Figure 7:
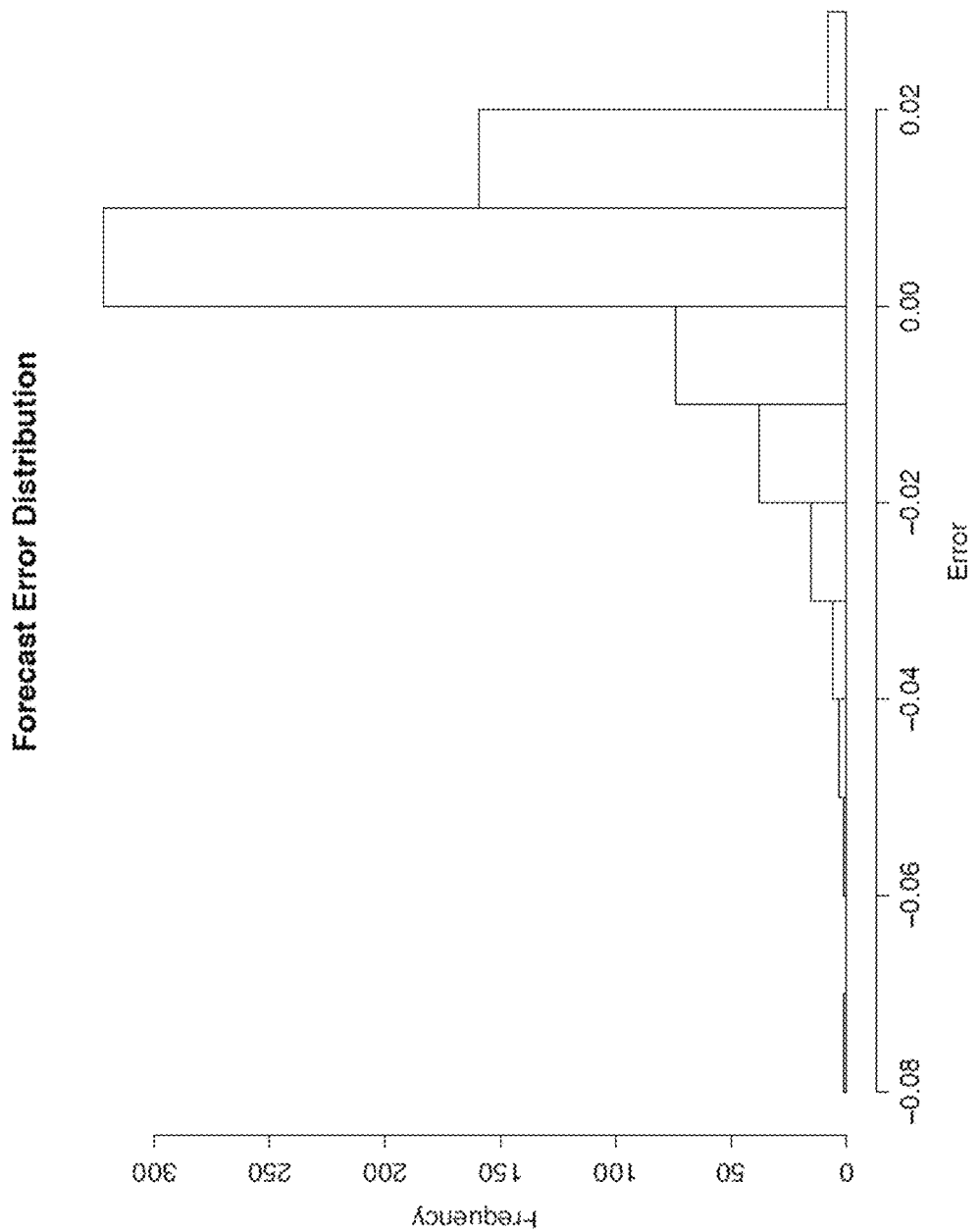
FIG. 7 is a histogram illustrating example forecast error distribution between the predicted resource consumption and the actual observed resource consumption in FIG. 6 in accordance with embodiments of the disclosed technology.

Experiments of predictive autoscaling using CPU utilization as an example have been conducted according to embodiments of the disclosed technology described above. As shown in FIGS. 6 and 7, the results of the experiments show that the predicted consumption values substantially match observed consumption values. For example, as shown in FIG. 6, the observed CPU utilization values substantially match the predicted values at both peaks 230 and valleys 232 in the plot shown in FIG. 6. Also, as shown in FIG. 7, errors between the predicted and observed values exceeding −0.04 and 0.02 occur much less frequently than errors of nearly 0.00.

Figure 8:
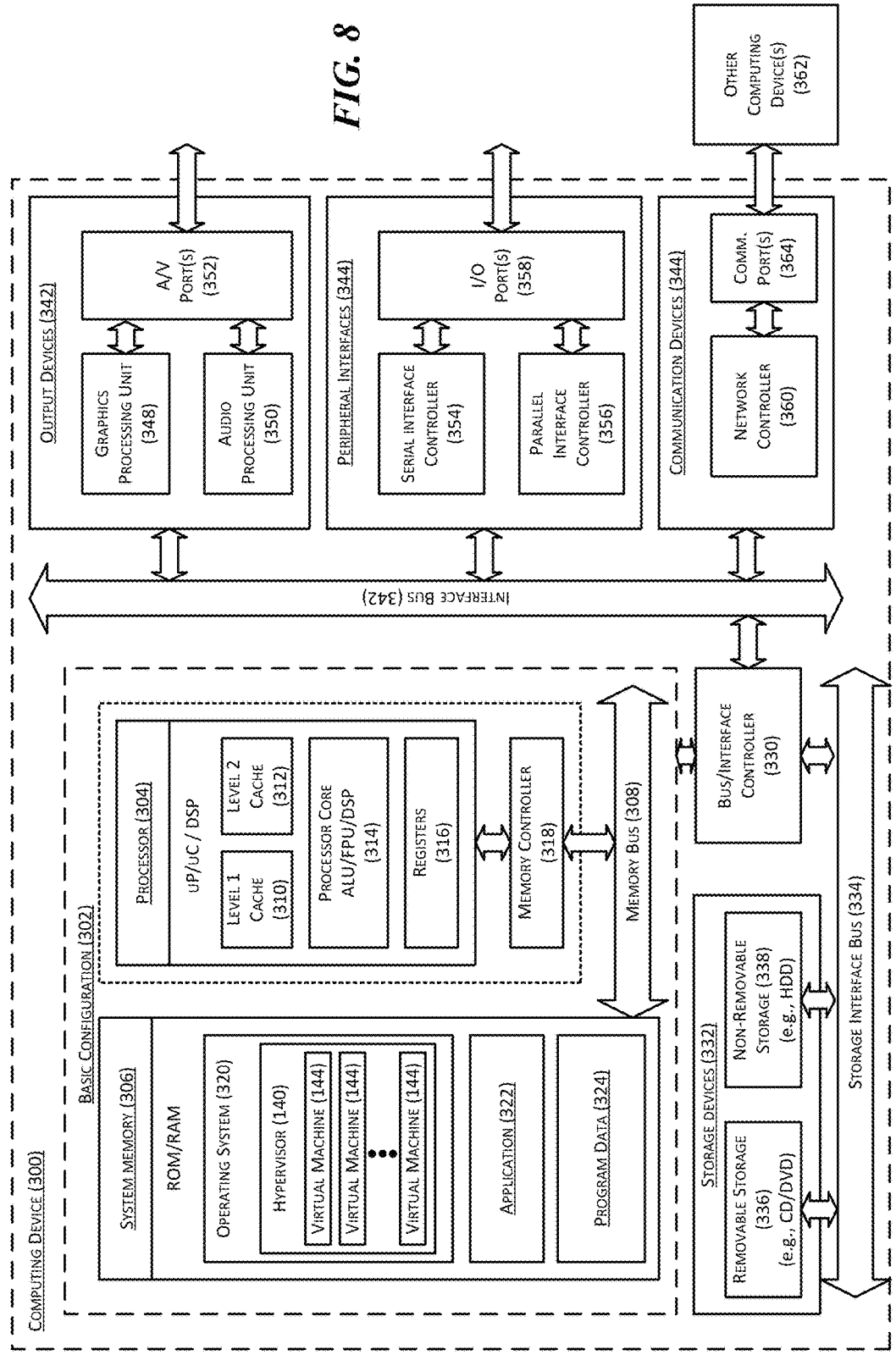
FIG. 8 is a computing device suitable for certain components of the distributed computing system in FIG. 1.

FIG. 8 is a computing device 300 suitable for certain components of the distributed computing system 100 in FIG. 1. For example, the computing device 300 can be suitable for the hosts 106, the client devices 102, the platform controller 125, or the predictive autoscaler 126 of FIG. 1. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor (pP), a microcontroller (pC), a digital signal processor (DSP), or any combination thereof. The processor 304 can include one more levels of caching, such as a level-one cache 310 and a level-two cache 312, a processor core 314, and registers 316. An example processor core 314 can include an arithmetic logic unit (ALU), a floating point unit (FPU), a digital signal processing core (DSP Core), or any combination thereof. An example memory controller 318 can also be used with processor 304, or in some implementations memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. As shown in FIG. 8, the operating system 320 can include a hypervisor 140 for managing one or more virtual machines 144. This described basic configuration 302 is illustrated in FIG. 8 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

Specific embodiments of the technology have been described above for purposes of illustration. However, various modifications can be made without deviating from the foregoing disclosure. In addition, many of the elements of one embodiment can be combined with other embodiments in addition to or in lieu of the elements of the other embodiments. Accordingly, the technology is not limited except as by the appended claims.

We claim:

1. A method performed by a computing device in a distributed computing system having a plurality of servers interconnected by a computer network, the method comprising:
   receiving data representing consumption values of a computing resource by multiple instances of an application executing on respective multiple servers in the distributed computing system, the computing resource includes a processor capacity, network capacity, or storage capacity;
   processing the received data into a time series having multiple resource consumption values by the application via aggregating the consumption values of the computing resource by the multiple instances of the application on the multiple servers in accordance with corresponding time stamps;
   decomposing the time series into a regular component and an irregular component, the regular component representing a portion of the time series having one or more of a trend, a cyclic pattern, or a seasonal pattern while the irregular component representing a random portion of the time series;
   generating a predicted consumption value of the computing resource by the application at a future time point according to the trend, cyclic pattern, or seasonal pattern of the regular component of the time series; and
   causing immediate adjustment of an amount of the computing resource provisioned in the distributed computing system for the application according to the generated predicted consumption value.

2. The method of claim 1 wherein generating the predicted consumption value includes:
   setting a long-term predicted consumption value of the computing resource by the application at the future time point according to the trend, cyclic pattern, or seasonal pattern of the regular component of the time series;
   applying a recurrent neural network to the irregular component to derive a short-term predicted consumption value of the computing resource by the application at the future time point; and
   modifying the long-term predicted consumption value with the short-term predicted consumption value to derive the predicated consumption value.

3. The method of claim 1 wherein generating the predicted consumption value includes:
   determining a long-term predicted consumption value of the computing resource by the application at the future time point according to the trend, cyclic pattern, or seasonal pattern of the regular component of the time series;
   determining a short-term predicted consumption value of the computing resource by the application at the future time point according to the irregular component; and
   combining the long-term and short-term predicted consumption values to derive the predicated consumption value.

4. The method of claim 1 wherein:
   receiving data representing consumption of the computing resource includes periodically receiving data representing consumption of the computing resource reported by the one or more servers via the computer network; and
   processing the received data includes generating individual data points of the time series by averaging the periodically received data over a predetermined time period to derive an average consumption value and associating the average consumption value with a time stamp.

5. The method of claim 1 wherein:
   receiving data representing consumption of the computing resource includes periodically receiving data representing consumption of the computing resource reported by the one or more servers via the computer network;
   processing the received data includes generating a data point of the time series by averaging the periodically received data over a predetermined time period to derive an average consumption value and associating the average consumption value with a time stamp;
   removing another data point from a beginning portion of the time series; and
   appending the generated data point to an end portion of the time series.

6. The method of claim 5, further comprising:
   decomposing the time series with the appended data point into another regular component and another irregular component; and
   regenerating the predicted consumption value of the computing resource by the application at another future time point according to the another regular component.

7. The method of claim 1 wherein causing immediate adjustment includes causing adjustment of the amount of the computing resource provisioned in the distributed computing system for the application before the future time point such that sufficient time is allowed to complete the adjustment of the amount of the computing resource provisioned in the distributed computing system.

8. The method of claim 1 wherein causing immediate adjustment includes causing immediate adjustment of the amount of the computing resource provisioned in the distributed computing system for the application when an amount of the computing resource consumed by the application does not exceed an overutilization threshold or an underutilization threshold.

9. The method of claim 1 wherein causing immediate adjustment includes causing immediate adjustment of the amount of the computing resource provisioned in the distributed computing system for the application without reactive adjustment of the amount of the computing resource provisioned in the distributed computing system when an amount of the computing resource consumed by the application exceeds an overutilization threshold or an underutilization threshold.

10. A method performed by a computing device in a distributed computing system having a plurality of servers interconnected by a computer network, the method comprising:
    receiving, via the computer network, data representing a predicted consumption value of a computing resource used by an application at a future time point in the distributed computing system, the application having multiple instances executing on respective multiple servers, the computing resource includes one or more of a processor capacity, network capacity, or storage capacity, wherein the predicted consumption value is set based on a trend, a cyclic pattern, or a seasonal pattern of historical consumption values of the computing resource used by the multiple instances of the application in the distributed computing system by aggregating consumption values of the computing resource by the multiple instances of the application on the respective multiple servers in accordance with corresponding time stamps; and in response to the received data, adjusting an amount of the computing resource provisioned in the distributed computing system for the application according to the received predicted consumption value when an amount of the computing resource currently consumed by the application does not exceed a preset overutilization threshold or a underutilization threshold.

11. The method of claim 10 wherein adjusting the amount of the computing resource provisioned in the distributed computing system includes adjusting the amount of the computing resource provisioned in the distributed computing system for the application before the future time point such that sufficient time is allowed to complete the adjustment of the amount of the computing resource provisioned in the distributed computing system.

12. The method of claim 10, further comprising:
determining whether the amount of the computing resource currently consumed by the application exceeds the preset overutilization threshold or the underutilization threshold; and
in response to determining that the amount of the computing resource currently consumed exceeds the preset overutilization threshold or the underutilization threshold, adjusting the amount of the computing resource provisioned in the distributed computing system according to a consumption value different than the received predicted consumption value.

13. The method of claim 10 wherein adjusting the amount of the computing resource provisioned in the distributed computing system includes instructing one or more of the servers to instantiate additional virtual machines for executing additional instances of the application according to the predicted consumption value.

14. The method of claim 10 wherein adjusting the amount of the computing resource provisioned in the distributed computing system includes instructing one or more of the servers to terminate one or more virtual machines individually executing an instance of the application according to the predicted consumption value.

15. A computing device in a distributed computing system having a plurality of servers interconnected by a computer network, the computing device comprising:
a processor; and
a memory containing instructions executable by the processor to cause the processor to:
receive data representing consumption values of a computing resource by multiple instances of an application executing on respective multiple servers in the distributed computing system, the computing resource includes a processor capacity, network capacity, or storage capacity;
generate a time series based on the received data by aggregating the consumption values of the computing resource by the multiple instances of the application on the multiple servers in accordance, the time series having multiple temporal resource consumption values;
derive a regular component of the time series from the generated time series, the regular component representing a portion of the time series having one or more of a trend, a cyclic pattern, or a seasonal pattern;
predict a future consumption value of the computing resource by the application at a future time point according to the trend, cyclic pattern, or seasonal pattern of the regular component of the time series; and
adjust an amount of the computing resource provisioned in the distributed computing system for facilitating execution of the application according to the generated future consumption value.

16. The computing device of claim 15 wherein the instructions are also executable by the processor to cause the processor to:
derive an irregular component from the generated time series, the irregular component representing a portion of the time series after removing the trend, the cyclic pattern, and the seasonal pattern;
apply a recurrent neural network to the derived irregular component to derive a short-term predicted consumption value of the computing resource by the application at the future time point; and
modify the predicted future consumption value with the derived short-term predicted consumption value.

17. The computing device of claim 15 wherein:
to receive the data representing consumption of the computing resource includes to receive the data representing consumption of the computing resource by multiple instances of the application executing on multiple servers in the distributed computing system;
the instructions are also executable by the processor to cause the processor to aggregate the received data to generate an overall consumption of the computing resource by the multiple instances of the application; and
to generate the time series includes to generate the time series based on the aggregated overall consumption of the computing resource by the multiple instances of the application.

18. The computing device of claim 15 wherein:
to derive a regular component of the time series includes to decompose the generated time series into the regular component and an irregular component;
the instructions are also executable by the processor to cause the processor to:
apply a recurrent neural network to the derived irregular component to derive a short-term predicted consumption value of the computing resource by the application at the future time point; and
modify the predicted future consumption value with the derived short-term predicted consumption value.

19. The computing device of claim 15 wherein to adjust an amount of the computing resource provisioned in the distributed computing system includes to instruct one or more of the servers to instantiate additional virtual machines for executing additional instances of the application according to the generated future consumption value.

20. The computing device of claim 15 wherein to adjust an amount of the computing resource provisioned in the distributed computing system includes to instruct one or more of the servers to terminate one or more virtual machines individually executing an instance of the application according to the generated future consumption value.

* * * * *